United States Patent
Smith

(10) Patent No.: US 7,668,968 B1
(45) Date of Patent: *Feb. 23, 2010

(54) CLOSED-LOOP VOICE-OVER-INTERNET-PROTOCOL (VOIP) WITH SENDER-CONTROLLED BANDWIDTH ADJUSTMENTS PRIOR TO ONSET OF PACKET LOSSES

(75) Inventor: Shawn W. Smith, Ventura, CA (US)

(73) Assignee: Global IP Solutions, Inc., San Francisco, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 10/248,002

(22) Filed: Dec. 9, 2002

Related U.S. Application Data

(63) Continuation-in-part of application No. 10/065,951, filed on Dec. 3, 2002, now Pat. No. 6,996,626.

(51) Int. Cl.
*G06F 15/16* (2006.01)

(52) U.S. Cl. .............. 709/234; 709/232; 709/233; 709/235; 370/229; 370/231

(58) Field of Classification Search ............ 709/203, 709/223–224, 231–235; 370/229, 231
See application file for complete search history.

(56) References Cited

U.S. PATENT DOCUMENTS

| | | | |
|---|---|---|---|
| 5,179,549 A | 1/1993 | Joos et al. | 370/232 |
| 5,274,625 A | 12/1993 | Derby et al. | 370/233 |
| 5,333,299 A | 7/1994 | Koval et al. | 713/400 |
| 5,444,707 A * | 8/1995 | Cerna et al. | 370/389 |
| 5,579,301 A * | 11/1996 | Ganson et al. | 370/229 |
| 5,737,531 A | 4/1998 | Ehley | 709/208 |
| 5,890,108 A | 3/1999 | Yeldener | 704/208 |
| 5,928,331 A | 7/1999 | Bushmitch | 709/231 |
| 5,933,803 A | 8/1999 | Ojala | 704/223 |
| 6,144,639 A | 11/2000 | Zhao et al. | 370/235 |
| 6,182,125 B1 | 1/2001 | Borella et al. | 709/218 |
| 6,219,704 B1 | 4/2001 | Kim et al. | 709/224 |
| 6,308,148 B1 | 10/2001 | Bruins et al. | 703/27 |
| 6,324,184 B1 | 11/2001 | Hou et al. | 370/468 |
| 6,356,545 B1 | 3/2002 | Vargo et al. | 370/355 |
| 6,389,032 B1 | 5/2002 | Cohen | 370/412 |
| 6,389,038 B1 | 5/2002 | Goldberg et al. | 370/471 |
| 6,393,016 B2 | 5/2002 | Wegner et al. | 370/352 |
| 6,404,764 B1 | 6/2002 | Jones et al. | 370/352 |
| 6,452,922 B1 | 9/2002 | Ho | 370/352 |

(Continued)

*Primary Examiner*—Shawki S Ismail
(74) *Attorney, Agent, or Firm*—Mark Rodgers

(57) ABSTRACT

A closed-loop voice-over-Internet-Protocol (VoIP) system has a local and a remote VOIP application. Each VOIP application monitors incoming packet arrival times and durations of audio data in the incoming packets to estimate bandwidth. The bandwidth estimates are forwarded to the other VOIP application. The forwarded bandwidth estimates are compared to a sending bandwidth. When the bandwidth estimate is above the sending bandwidth, compression and audio-frame decimation are reduced to improve voice quality. When the bandwidth estimate falls below the sending bandwidth, audio compression and decimation are increased to improve efficiency. Packet size can also be increased. Congestion estimates can also be sent with the audio data, causing packet transmission to pause until congestion ends. Incoming packet latencies are compared to a moving average to determine the congestion estimate, while bandwidth estimates are made by comparing packet audio duration to time between packet arrivals.

10 Claims, 10 Drawing Sheets

U.S. PATENT DOCUMENTS

| | | | |
|---|---|---|---|
| 6,456,594 B1 | 9/2002 | Kaplan et al. | 370/238 |
| 6,473,423 B1 | 10/2002 | Tebeka et al. | 370/352 |
| 6,834,053 B1 * | 12/2004 | Stacey et al. | 370/395.4 |
| 6,999,451 B2 * | 2/2006 | Yotsui | 370/356 |
| 7,079,486 B2 * | 7/2006 | Colavito et al. | 370/231 |
| 2002/0085587 A1 * | 7/2002 | Mascolo | 370/477 |
| 2002/0093911 A1 * | 7/2002 | Yotsui | 370/229 |
| 2002/0141392 A1 * | 10/2002 | Tezuka et al. | 370/352 |
| 2003/0107991 A1 * | 6/2003 | Tezuka et al. | 370/229 |
| 2003/0152094 A1 * | 8/2003 | Colavito et al. | 370/412 |
| 2004/0002339 A1 * | 1/2004 | O'Connor | 455/450 |
| 2004/0204935 A1 * | 10/2004 | Anandakumar et al. | 704/230 |

* cited by examiner

CLOSED-LOOP VOICE-OVER-INTERNET-PROTOCOL (VOIP) WITH SENDER-CONTROLLED BANDWIDTH ADJUSTMENTS PRIOR TO ONSET OF PACKET LOSSES

CROSS REFERENCE TO RELATED APPLICATIONS

This application is a continuation-in-part of the co-pending application for Continuous Bandwidth Assessment and Feedback for Voice-Over-Internet-Protocol (VOIP) Comparing Packet's Voice Duration and Arrival Rate, U.S. Ser. No. 10/065,951, filed Dec. 3, 2002.

BACKGROUND OF INVENTION

This invention relates to voice-over-Internet-Protocol (VoIP) systems, and more particularly to adjustments of current bandwidth usage of VoIP channels on an unregulated network such as the Internet.

Traditional applications such as telephone calling can now use the Internet rather than traditional telephone networks. Voice-over-Internet-Protocol (VoIP) applications capture a user's voice, digitize and compress the voice, and transmit the coded voice as data inside Internet-protocol (IP) packets that can be sent over the Internet.

VoIP applications can be installed on personal computers (PC's), other devices connected to the Internet, or on translation servers such as Internet-to-Telephone gateways or Protocol Converters. Each party to a call runs a local copy or client of the VoIP application.

FIG. 1 is a diagram of a prior-art VoIP system experiencing packet loss. VOIP application 10 is operated by user A while VOIP application 12 is operated by user B at different nodes on the Internet. User A's speech is digitized, coded, compressed, and fitted into IP packets 20 by VOIP application 10. These IP packets 20 containing user A's voice are routed over the Internet to VOIP application 12.

VOIP application 12 receives these IP packets 20, extracts and de-compresses the voice data, and plays the voice as audio to user B. User B's voice is then captured, coded, compressed, and fitted into IP packets 22 by VOIP application 12. IP packets 22 containing user B's voice are also routed over the Internet back to VOIP application 10 for playback to user A, achieving a full-duplex voice call.

IP packets can be routed over a wide variety of paths using the Internet. Indeed, the de-centralized nature of the Internet allows routing decisions to be made at a number of points along the paths between applications 10, 12. The paths taken by packets 20 in the A-to-B direction can differ from the path taken by packets 22 in the reverse (B-to-A) direction. For example, packets 20 may pass through intermediate routers 14, 16, while packets 22 pass through router 18. Such non-symmetric routing can produce non-symmetric routing delays and challenges for the VOIP system.

Various network problems may occur. A router may temporarily fail, causing some packets to be delayed or lost entirely. The number of arriving packets may suddenly jump, producing congestion such as at router 18. Router 18 may delay packets 24 while the increased packet load occurs. Packets may continue to be delayed after the initial failure is fixed as the packet backlog is worked off. If the input buffers for router 18 overflow, packets 24 may be dropped or lost rather than simply delayed.

Bandwidth limitations may also occur. Packets may need to reach a user through a low-bandwidth dial-up modem line. Some types of modems such as satellite Internet Access or Asymmetric Digital-Subscriber Lines (ADSL) may have much more bandwidth in one direction (download) than in the other (upload). Occasional interference may further delay packets. The modem user may send email or browse a web site, reducing further the limited bandwidth available to the VOIP application's packets. Thus bandwidth limitations may be both permanent and temporary.

VOIP applications 10, 12 may have limited network status communicated between them. Sending VOIP application 12 may be unaware of packet routing problems on the packets it sends. The problems may not exist in packets received by VOIP application 12 from VOIP application 10, as the routing paths may not be symmetrical. Even on a symmetric network congestion or limitations on bandwidth may exist only in one direction, such as upload and download directions on a cable modem or ADSL.

VoIP application 10 cannot determine its outbound bandwidth simply by looking for delays of incoming packets received from VoIP application 12, since different routes may be taken by packets 20 sent and packets 22 received by application 10.

During initialization of a call between applications 10, 12, some provisioning may be performed to determine the initial bandwidths available between applications 10, 12. Such provisioning may be similar to fax machines that negotiate compression standards used and bandwidth or baud rate for each call. However, this initial provisioning is often not continuous. Changes to the Internet that later occur during the call are not detected once provisioning is over and the call is started.

FIG. 2A shows voice data that is packetized and transmitted. The user's voice can be captured as analog waves of varying frequencies that are digitized and coded. The coded voice data is divided into packets and transmitted. Sequence numbers are added to the packets to allow the packets to be re-ordered when some are delayed more than others. The sequence numbers thus allow for out-of-order reception and detection of missing packets. In this example the coded voice is divided into four packets, each packet containing coded voice data for an equal, fixed time period of 20 milli-seconds.

FIG. 2B shows packetized voice data received after varying network delays. The sequence numbers are used to re-order the packets when they arrive with varying network delays.

In this example, packet 2 is delayed slightly, causing a gap to occur between the end of playing the voice for packet 1, and the start of voice play for packet 2. A larger gap occurs between packets 2 and 3, between times S2 and S2'. These gaps may be filled in by interpolating voice data, or by adding silence. However, the pace of the user's voice may seem uneven or jerky due to such gaps.

Of course, all voice could be delayed by a large amount, such as 5 seconds, to allow for late packets. However, this requires a larger packet-input buffer and would greatly increase the delay or latency that the user hears. This delay may be noticeable to the user and annoying. Full-duplex conversation becomes impractical as the delay grows to several seconds. Thus the input buffer has a practical size limit, and packets cannot be delayed for too long. The quality of a full-duplex conversation is better when buffering and delays are kept as small as possible.

Such gaps caused by delayed packets can reduce the quality of the voice played. When a temporary interruption occurs along the path taken by the VoIP packets, packets may pile up in buffers near the point of interruption. Should service be quickly restored, the stored packets in the buffers may be sent after some delay. However, longer-duration interruptions can cause router buffers to overflow. Packets may then be dropped or discarded before reaching their destinations.

Once the interruption ends, the older packets are likely to be sent first by the router. Newer packets may be delayed even after the interruption ends as the backlog of packets is transmitted. Thus stale packets of older voice data may be delivered before more current voice data. These older packets may already be too old to be played, resulting in a lengthening of what was a brief moment of congestion.

Some VOIP systems may detect packet loss or a drop in voice quality. However, packet loss is not sufficiently sensitive to early stages of congestion, since congestion usually begins before packet loss occurs. Waiting to detect packet loss allows the congestion to become much worse before action is taken.

Congestion and Bandwidth Detection

Rather than simply wait for packet losses to mount up, the parent application detects such congestion beginning to occur. In addition to congestion estimates, bandwidth may also be estimated to detect when bandwidth is limited but packet loss is not yet occurring.

Congestion and bandwidth restrictions are detected by one VOIP application and sent to the other VOIP application. Each VOIP application monitors and estimates congestion and bandwidth on its inbound direction for use by the other VOIP application. Congestion and bandwidth estimates can be embedded in the VOIP packets for sending to the other VOIP application.

VOIP applications can respond to the congestion and bandwidth estimates in a variety of ways. The present application describes a closed-loop system wherein one VOIP application estimates congestion and bandwidth while the other VOIP application receives the bandwidth and congestion estimates and adjusts its packet flow to compensate.

What is desired is a VOIP application that can continuously receive estimates of network problems such as congestion, limited bandwidth, and delays. A VOIP system that can continuously respond to such estimates by adjusting audio-compression and bandwidth usage is desirable. A pair of VOIP applications that continuously monitor network conditions and adjust packet flow is desired. A closed-loop feedback VOIP system for network monitoring and audio-packet-flow adjustment is desired.

DETAILED DESCRIPTION

The present invention relates to an improvement in voice-over-Internet-Protocol (VOIP) systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein, disclosed.

Figure 1:
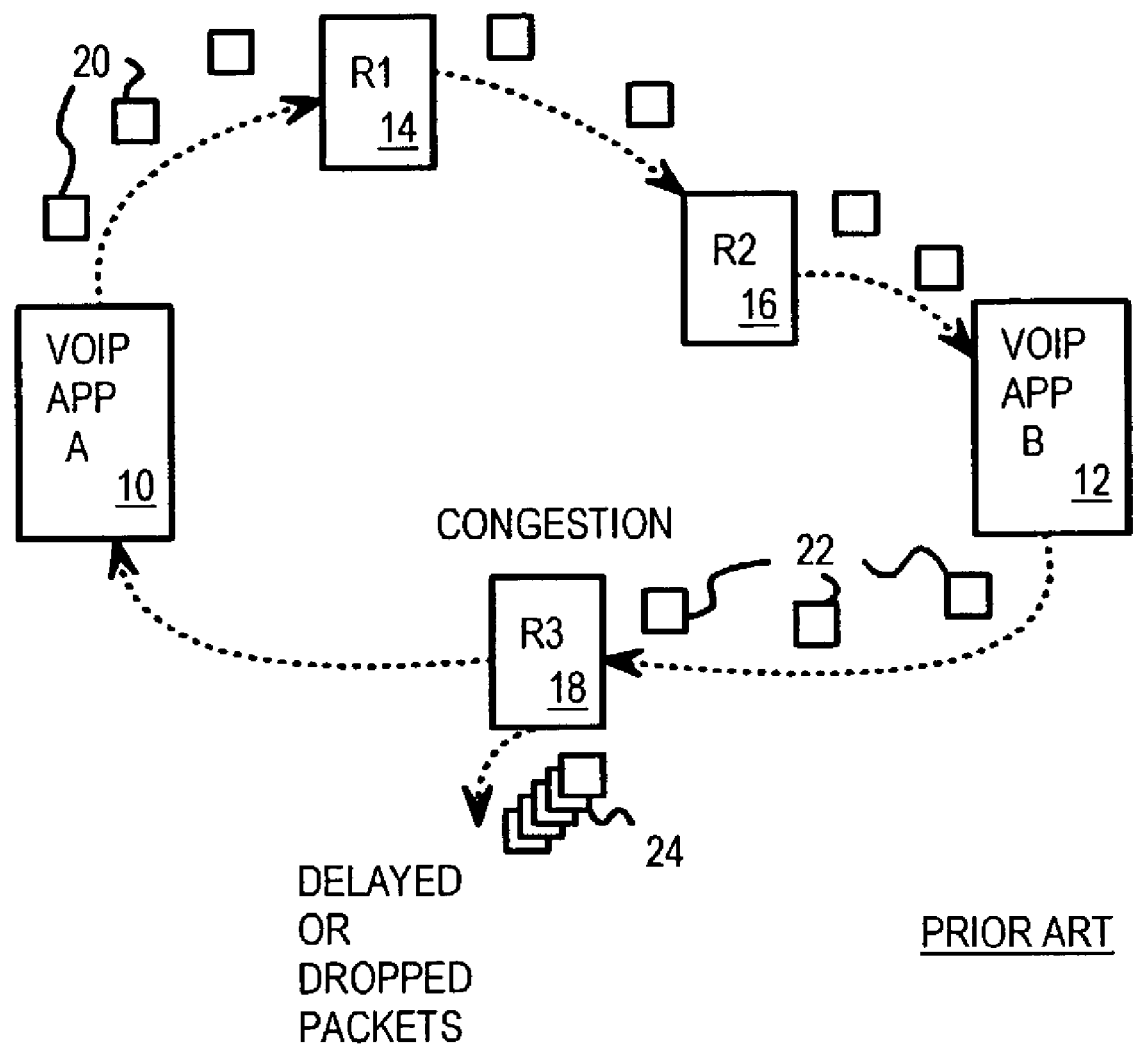
FIG. 1 is a diagram of a prior-art VoIP system experiencing packet loss.
Figure 2A:
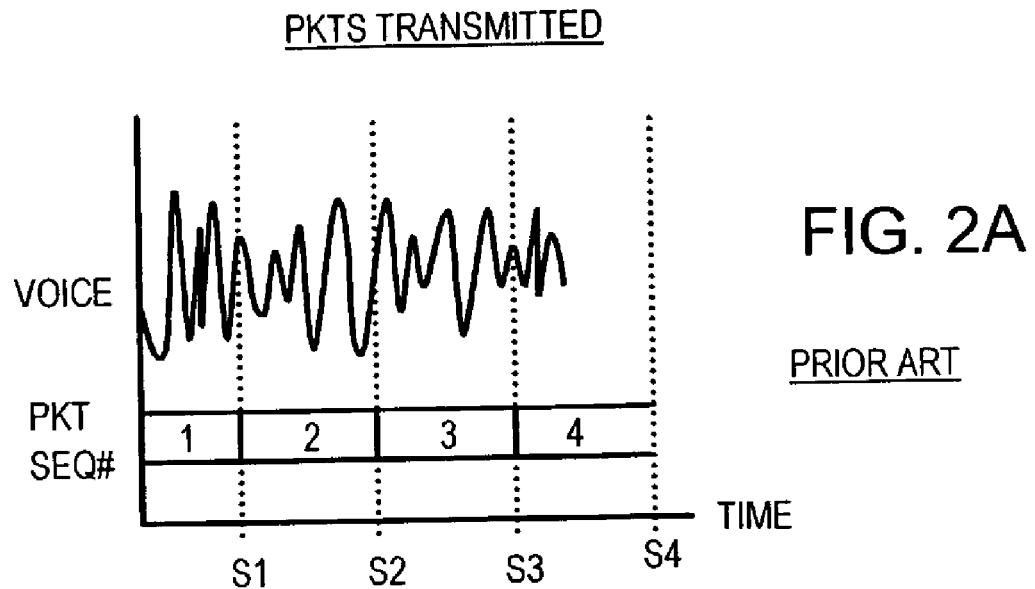
FIG. 2A shows voice data that is packetized and transmitted.
Figure 2B:
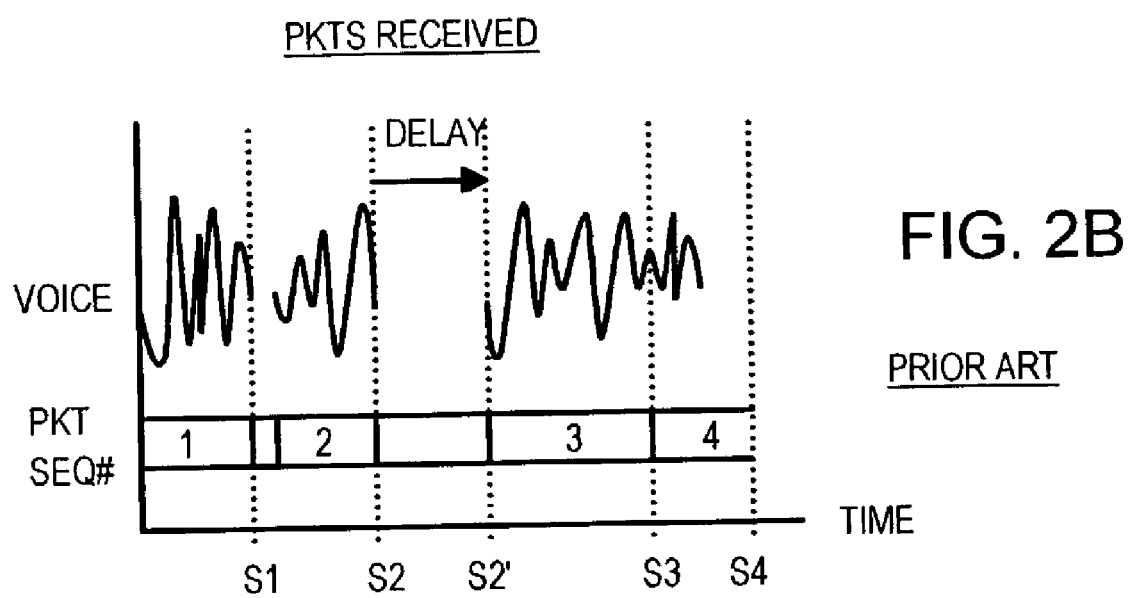
FIG. 2B shows packetized voice data received after varying network delays.
Figure 3:
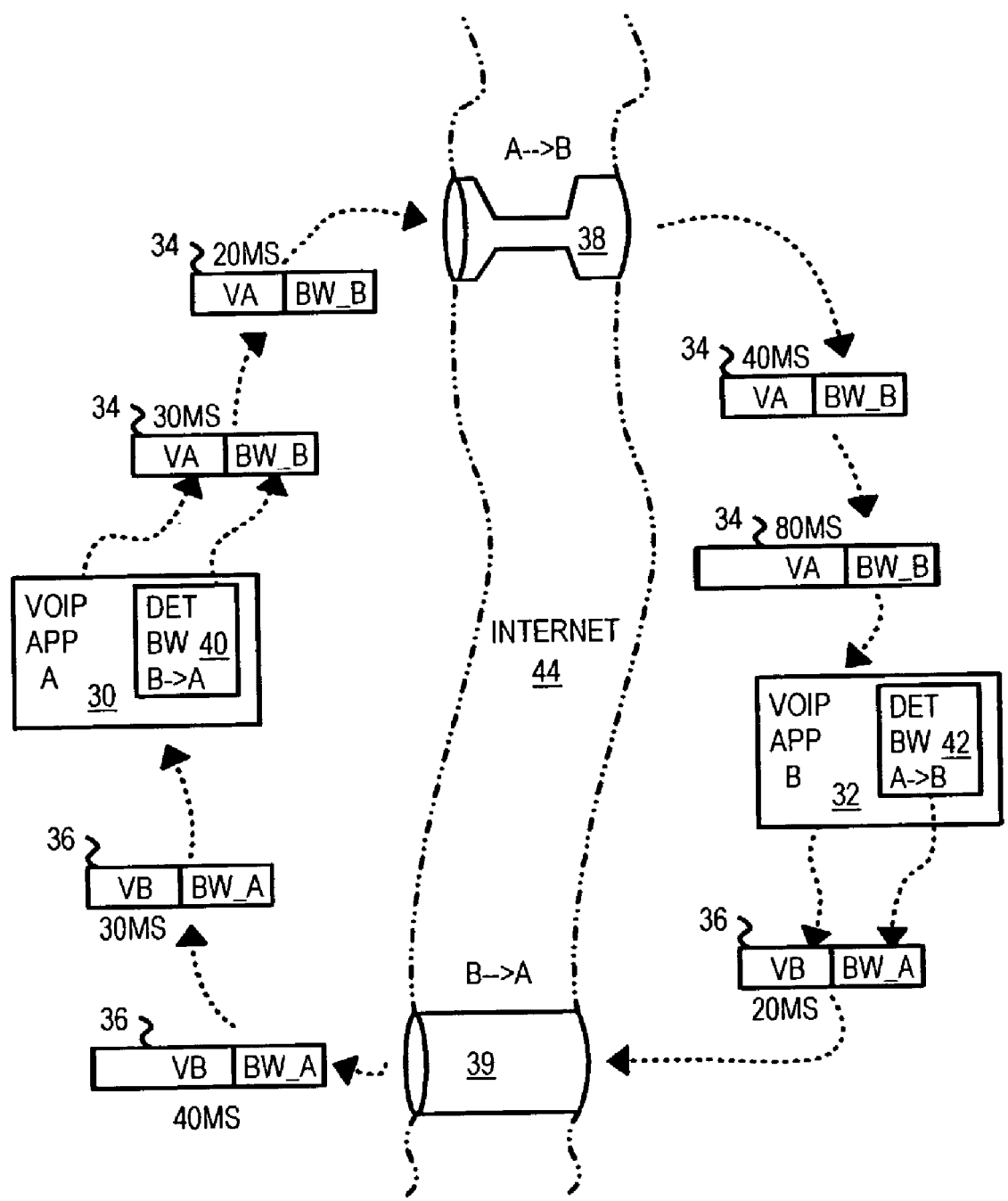
FIG. 3 is a diagram of a closed-loop VOIP system with VOIP applications that continuously receive bandwidth estimates embedded in incoming packets and adjust bandwidth consumption of outgoing packets.

FIG. 3 is a diagram of a-closed-loop VOIP system with VOIP applications that continuously receive bandwidth estimates embedded in incoming packets and adjust bandwidth consumption of outgoing packets. VOIP application 30 captures, encodes, compresses, and packetizes voice from user A and sends IP packets 34 over Internet 44 to VOIP application 32 for playback to user B. VOIP application 32 likewise captures, encodes, compresses, and packetizes voice from user B and sends IP packets 36 over Internet 44 to VOIP application 30 for playback to user A.

Packets 34 from user A to B travel through path 38, which has a restricted bandwidth. For example, a router may be congested or a dial-up modem may be in path 38. Packets 36 from user B to user A travel through Internet 44 on a different route, path 39, which has a larger bandwidth in this example and at the time shown.

Bandwidth detector 40 is part of VOIP application 30. Incoming packets 36 are analyzed by bandwidth detector 40 to determine the packets' travel time along path 39 and indirectly estimate the bandwidth of path 39. This bandwidth estimate from bandwidth detector 40 is added to outgoing packets 34. Packets 34 contain both voice data from user A, VA, and the bandwidth estimate for packets 36 sent by user B, BW_B.

When packets 34 are received by VOIP application 32, user A's voice data VA is extracted and played back to user B, and the bandwidth estimate BW_B is read, allowing VOIP application 32 to adjust or halt its transmission of outgoing packets 36. For example, when bandwidth is reduced, VOIP application 32 can signal user B of the problem, such as by generating an audible beep or displaying a quality meter on a visual interface to indicate the poor bandwidth.

VOIP application 32 can adjust its audio compression ratio to change its bandwidth consumption in response to changing bandwidth estimates received from VOIP application 30. When bandwidth estimates are reduced, VOIP application 32 can increase audio compression or use more efficient coding methods. Audio frames can be dropped to reduce bandwidth consumption. The quality of audio playback can be reduced to squeeze the audio packets into the more-restricted network pipe. Larger more efficient packets can be used.

Bandwidth detector 42 in VOIP application 32 also measures the arrival rate of incoming packets 34 to estimate the bandwidth of path 38. This bandwidth estimate for user A, BW_A, is added to outgoing packets 36 which contain user B's voice data, VB. Thus packets 36 contain VB and BW_A, while packets 34 contain VA and BW_B.

BW Estimates and Audio-Compression Adjustments Yield Closed-Loop VOIP

VOIP application 30 can also adjust its audio compression ratio to change its bandwidth consumption in response to changing bandwidth estimates received from VOIP application 32. When bandwidth estimates are reduced, VOIP application 30 can increase audio compression or use more efficient coding methods for packets 34. Audio frames can be dropped to reduce bandwidth consumption. The quality of audio playback can be reduced to squeeze the audio packets into the more-restricted network pipe. Larger, more efficient packets can be used.

For example, packets 34 have varying audio-playback durations. Less-efficient packets 34 have durations of 20 or 30 ms. When bandwidth estimates are reduced, larger, more bandwidth-efficient packets 34 having 40 or 80 ms of audio-playback can be used. The overall system of VOIP applications 30, 32 is closed-loop. The bandwidth of the A-to-B network path 38 is continuously monitored by VOIP application 32, which sends estimates BW_A in packets 36 back to VOIP application 30. On receiving these bandwidth estimates, VOIP application 30 adjusts its audio coding and packet size to compensate for increases or decreases in the bandwidth estimate. The bandwidth used by packets 34 is adjusted, which can cause different readings of available bandwidth by VOIP application 32.

For example, when VOIP application 32 detects a lower bandwidth on A-to-B path 38, it reduces BW_A. VOIP application 30 receives packets 36 with a lower BW_A, and increases the packet size and audio compression ratio at the expense of reduced audio quality. This reduces the bandwidth occupied by packets 34. The reduced bandwidth consumption of packets 34 better fits through restricted path 38.

One-Way Latency Measured, Not Round-Trip Time

Bandwidth detector 42 in VOIP application 32 also can measure the travel time or latency of incoming packets 34 to estimate the congestion of path 38. When latency begins to increase, congestion is starting to appear.

The latency or travel time measured by bandwidth detector 40 is not the round-trip travel time. The round-trip travel time includes both paths 38, 39. Instead, only the one-way latency is measured, from VOIP application 32 to VOIP application 30 over path 39. Separate bandwidth and congestion estimates allow for asymmetric latencies, such as when path 38 is restricted while path 39 is not. More precise bandwidth estimates are thus possible.

Congestion estimates can also be responded to in a closed-loop fashion. For example, congestion in restricted path 38 can be detected by VOIP application 32 from the increased latency of incoming packets 34. A congestion estimate is increased and sent in packets 36 back to VOIP application 30. VOIP application 30 may delay sending packets until the congestion ends and the congestion estimates from VOIP application 32 drop. If the congestion is momentary, the delayed packets can be sent late by VOIP application 30, or fresher packets can be sent and the older packets dropped before transmission.

This prevents compounding the congestion problem by sending more packets into a congested router. The user can also be notified that his packets are not getting through, so he can delay speaking.

Figure 4:
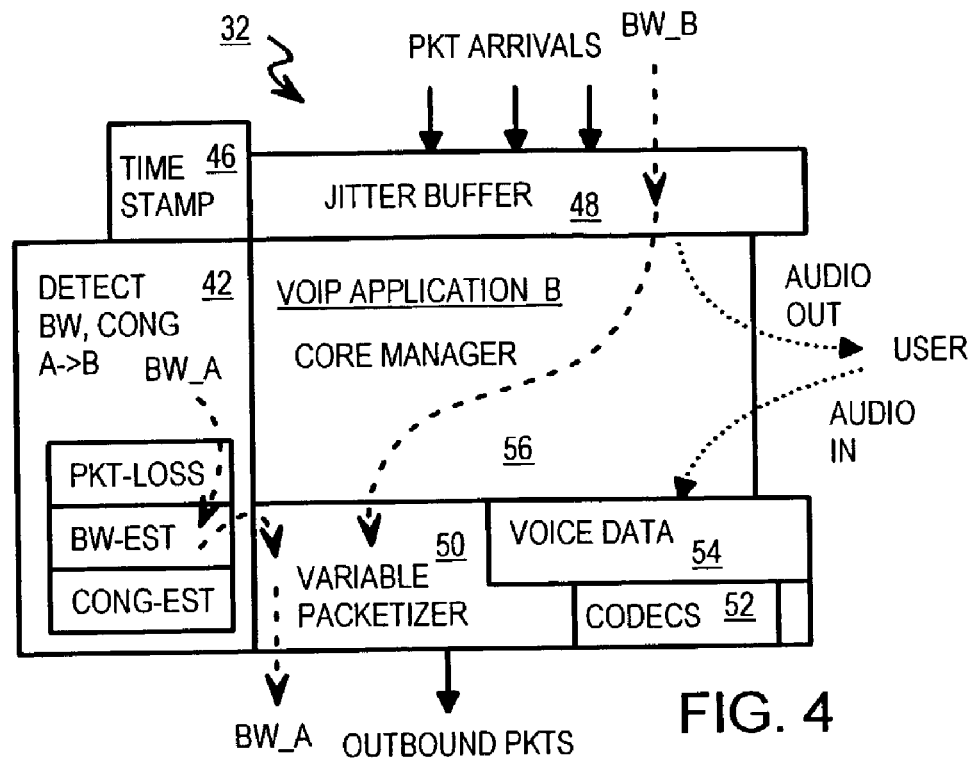
FIG. 4 shows in more detail a VOIP application with a bandwidth detector and a variable packetizer responsive to bandwidth estimates.

FIG. 4 shows in more detail a VOIP application with a bandwidth detector and a variable packetizer responsive to bandwidth estimates. VOIP application 32 captures user B's voice and stores the digitized voice as voice data 54. Codecs 52 are one or more voice encoders that compress and encode the raw digitized voice using a variety of algorithms. Some algorithms may be more bandwidth-efficient than others but have lower voice quality. Standard as well as proprietary codecs can be used.

The incoming packets contain bandwidth and/or congestion estimates from the other VOIP application. Jitter buffer 48 sends these estimates to variable packetizer 50. Variable packetizer 50 forms the outgoing IP packets by adding headers and catalogs of the voice data, to the encoded voice data from codecs 52. The codecs 52 selected can be responsive to the bandwidth estimate received from the packets in jitter buffer 48.

Variable packetizer 50 can adjust bandwidth consumption by varying the packet size and audio compression. Larger, more efficient packets can be used to reduce overall bandwidth consumption. A codec with greater audio compression can be used, and audio frames can be dropped altogether to significantly reduce bandwidth consumption when a severe loss of bandwidth occurs.

Incoming packets with user A's voice data are received and stored by jitter buffer 48. Some delay and variation in packet reception is accommodated by jitter buffer 48, and packets can be re-ordered by sequence number if received out of order. The packets are sent to core manager 56 of VOIP application 32, which extracts the voice data from the packets, examines the voice catalog, and selects the specified codec to decode and decompress the voice data. The final decoded, decompressed voice data is played as audio to user B. Core manager 56 may contain a variety of software modules including a user interface or may call other modules, library, or operating system routines.

Two Different Bandwidth Estimates: Incoming BW_A and Outgoing BW_B

Two different bandwidth estimates exist. BW_A is generated by bandwidth detector 42 (FIG. 3) by examining arrival rates and audio durations of incoming packets arriving at jitter buffer 48 (FIG. 4). BW_A is sent to variable packetizer 50 to be embedded inside the outbound packets 36 being sent to VOIP application 30.

The second bandwidth estimate, BW_B, is embedded inside the incoming packets 34 that arrive at jitter buffer 48. This bandwidth estimate was made by the other VOIP application. Variable packetizer 50 and/or core manager 56 use BW_B to alter the audio compression ratio, packet size, and audio frame skipping to adjust the bandwidth consumed by outgoing packets 36. The bandwidth consumed is adjusted to more closely match the bandwidth estimate received, BW_B.

Latency Measured by Time-Stamps

Time stamper 46 provides time-stamps or clock values that are an indication of time. Time stamper 46 generates the arrival time for each packet received by jitter buffer 48. Each packet also contains a send time that was included by the other VOIP application. Bandwidth detector 42 compares the arrival time with the send time for each packet to get the packet's one-way travel time or latency. The change in latency over time is used to determine when congestion occurs.

The arrival rate of incoming packets is used to estimate incoming bandwidth. For example, when the arrival times between packets increase, bandwidth is reduced. Bandwidth detector 42 generates current estimates for the incoming bandwidth, BW-EST, and congestion, CONG-EST.

Variable packetizer 50 receives the bandwidth and congestion estimates from bandwidth detector 42 and adds these to outgoing packets. The estimates may be numerical values such as 5-bit or 8-bit binary numbers that represent a magnitude of bandwidth or congestion, or may be more qualitative values such as 2 or 3-bit values that indicate "good", "average", "poor", or "blocked" paths. One-bit values such as a congestion flag may also be used.

When packets fail to arrive at jitter buffer 48, or are substantially late, such as more than 2 seconds, the packet loss counter is incremented. The packet loss counter PKT-LOSS may also be included in outgoing packets.

Figure 5:
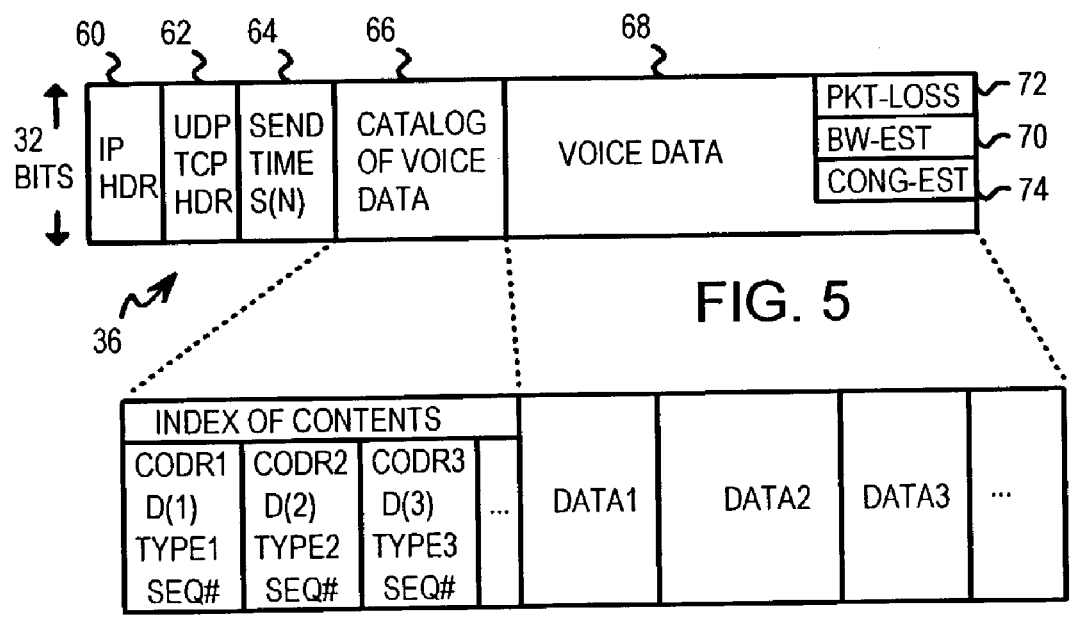
FIG. 5 shows an outgoing VOIP packet with bandwidth and congestion estimates for the incoming path.

FIG. 5 shows an outgoing VOIP packet with bandwidth and congestion estimates for the incoming path. IP packet 36 includes network-level header information such as a Telnet-Connect-Protocol (TCP) or user datagram protocol (UDP) header. Ethernet and Internet Protocol (IP) information may also be included. IP packet 36 may be further encapsulated during routing, such as by adding Virtual Private Networking (VPN) or other protocol layering and translations.

IP header 60 contains the destination and source IP addresses while TCP/UDP header 62 contains the TCP or UDP port or other TCP information. Checksums and other information may also be included. Application audio or voice data field 68 contains the compressed and encoded voice data and may be sub-divided into several sub-fields.

Send time field 64 contains the send time S(N) or timestamp value placed into packet 36 when the packet was transmitted. Catalog 66 is a directory of the voice-data contents of voice-data field 68. Voice-data field 68 may be broken into segments called audio frames, Data1, Data2, Data3, which are listed in the index of contents in catalog 66. Catalog 66 can specify a number of attributes for each segment, such as the codec used, the audio duration of the segment, the type (such as voice/silence/silence-identifier) and the sequence number of the segment. Segments can carry their own sequence numbers independent of the packet sequence number, or in a simpler implementation the packet sequence number can be used in conjunction with accumulated catalog frame duration markers to know the exact timestamp of each segment in the packet.

The playing time for the entire packet of voice data, such as 20 milli-seconds, is the duration D(N). This voice duration can be explicitly or implicitly contained in catalog 66. The packet duration may have to be calculated by adding durations of segments (Data1, Data2, Data3 . . . ) of voice data in voice-data field 68, or by considering the kind of codec and compression used and the number of bytes of voice data. The overall size of the packet and its header is variable as the packetizer can choose how many audio frames to include in a packet. The packetizer can mix several different types of compression and select a subset of audio data to not be sent to reduce the amount of data that must be sent for a given period of time represented by the packet.

The bandwidth estimate BW-EST, congestion estimate CONG-EST, and packet-loss counter PKT-LOSS can be added to the end of packet 36. Often unused bits are available at the end of the compressed voice data in voice-data field 68, or additional bits can be added to packet 36 for estimate fields 70, 72, 74, which contain the bandwidth, packet-loss, and congestion values. Not all of fields 70, 72, 74 need to be present in all packets.

Figure 6:
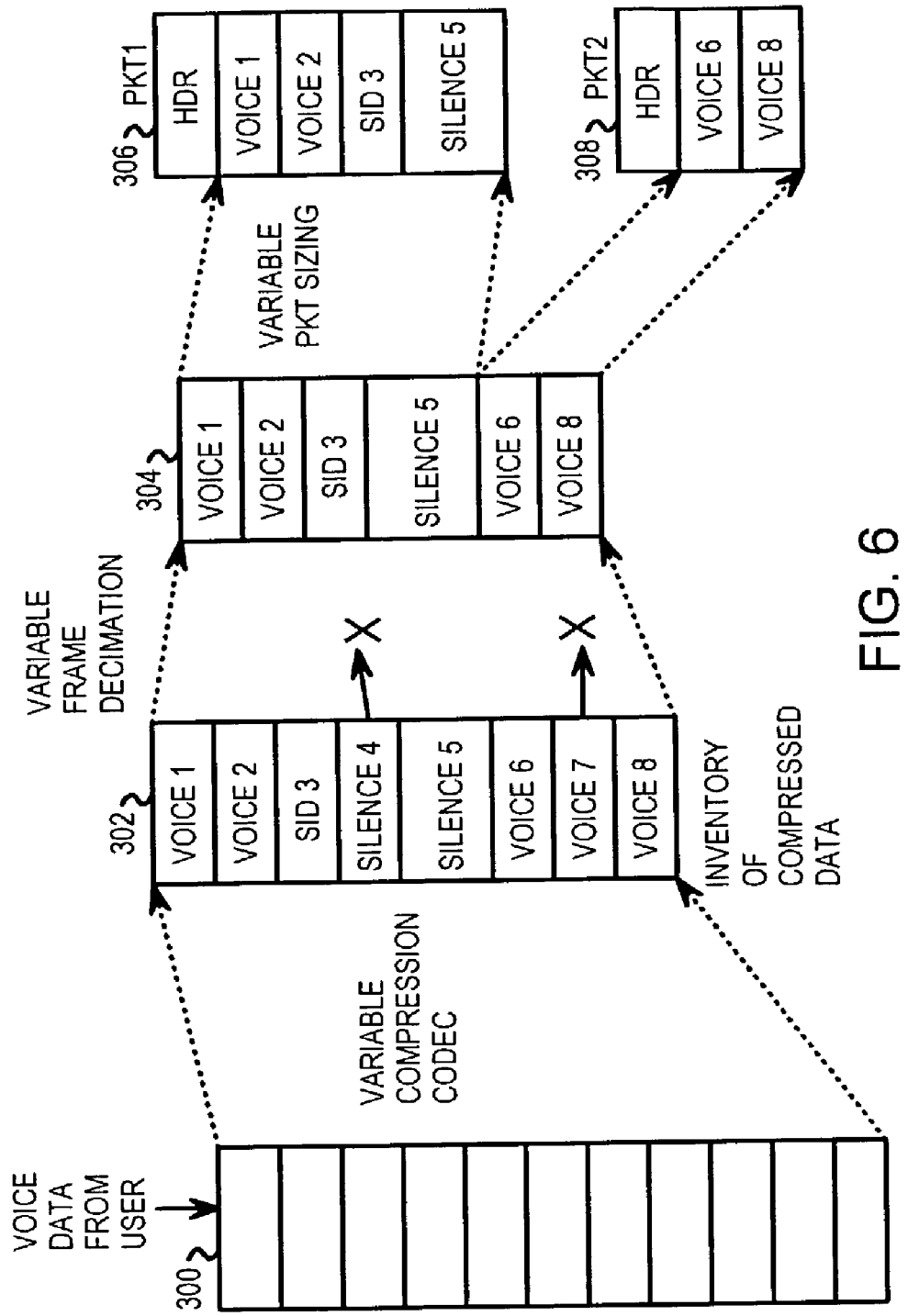
FIG. 6 highlights variable audio-compression and packet sizes.

FIG. 6 highlights variable audio-compression and packet sizes. The audio or voice data captured from the user is stored as voice data 300. This data 300 is normally in a digitized format but occupies a relatively large amount of storage space compared to what it will require once compressed. This digitized voice data 300 is encoded and compressed by one or more codecs to produce compressed data 302.

Different codecs and coding methods can be used for different segments or frames of the audio data. For example, voice frames contain talking voice data and use higher-quality coding methods. Voice data is in frames 1, 2, 4, 6, 7, and 8.

When the user pauses, a period of silence is detected. Silence Identifier SID identifies a period of silence. A lower-quality codec that produces higher compression can be used for these silence periods, such as frames 4 and 5. In some cases the length of silent time can be coded rather than coding the background noise. Compression can thus be very high for silent periods.

The coded, compressed data 302 can be further reduced in size by decimation. Some of the less-important frames can be deleted. The location of the deleted frames are noted in the audio packet catalog and the receiving VOIP application must re-create the deleted frames, perhaps by interpolating from the surrounding audio frames, or by inserting silence or some pre-defined sound.

In this example, frames 4 and 7 are deleted by decimation. Frame 4 is a silence frame but frame 7 is a voice frame.

The coded, compressed, and decimated audio data 304 has a smaller size than original voice data 300 or compressed data 302. The amount of reduction, or the audio-compression ratio, can be adjusted to reduce or expand the bandwidth used by the audio packets to better match the bandwidth estimates. Audio quality versus use of bandwidth can be adjusted over a very wide range using this technique.

Decimated audio data 304 is then divided into IP packets by the variable packetizer. The packet size is larger when more frames and larger frames are included in a packet than when fewer and smaller audio frames are included. For example, packet 306 is larger than packet 308. Packets the size of packet 306 rather than the size of packet 308 can be used to increase efficiency when the bandwidth estimate is reduced. Efficiency is higher with larger packets because the header is shared by a larger number of frames in the larger packets.

Each packet 306, 308 has an IP header attached and a UDP or TCP header following the IP header. Packet 306 has audio frames 1, 2, 3, and 5, while packet 308 has audio frames 6 and 8. The frame order could be non-sequential when frame sequence numbers are included in the packet's catalog.

Figure 7A:
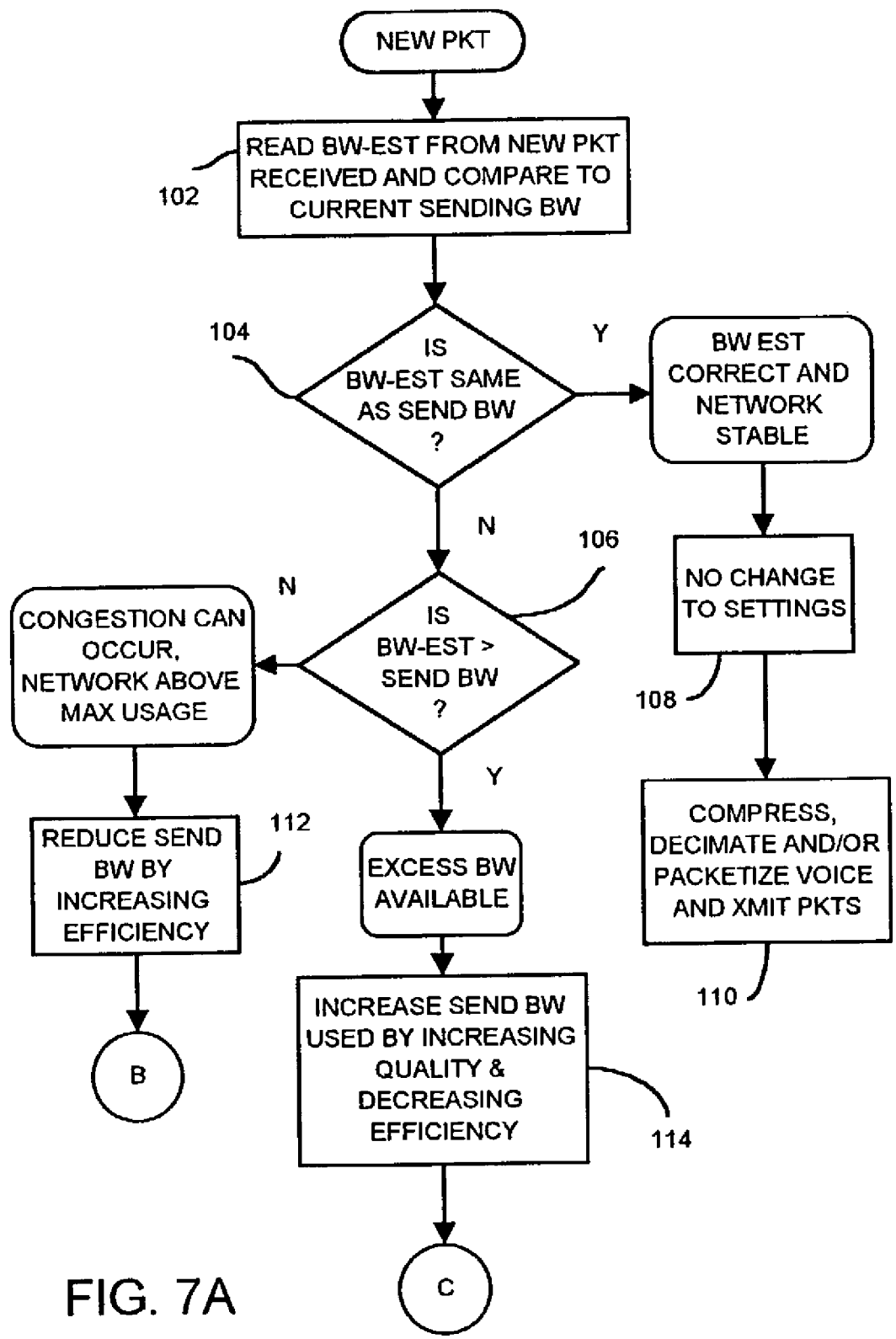
FIGS. 7A-C are flowcharts showing variable coding, compression, decimation, and packet sizing in response to bandwidth estimates received from a remote VOIP application.
Figure 7B:
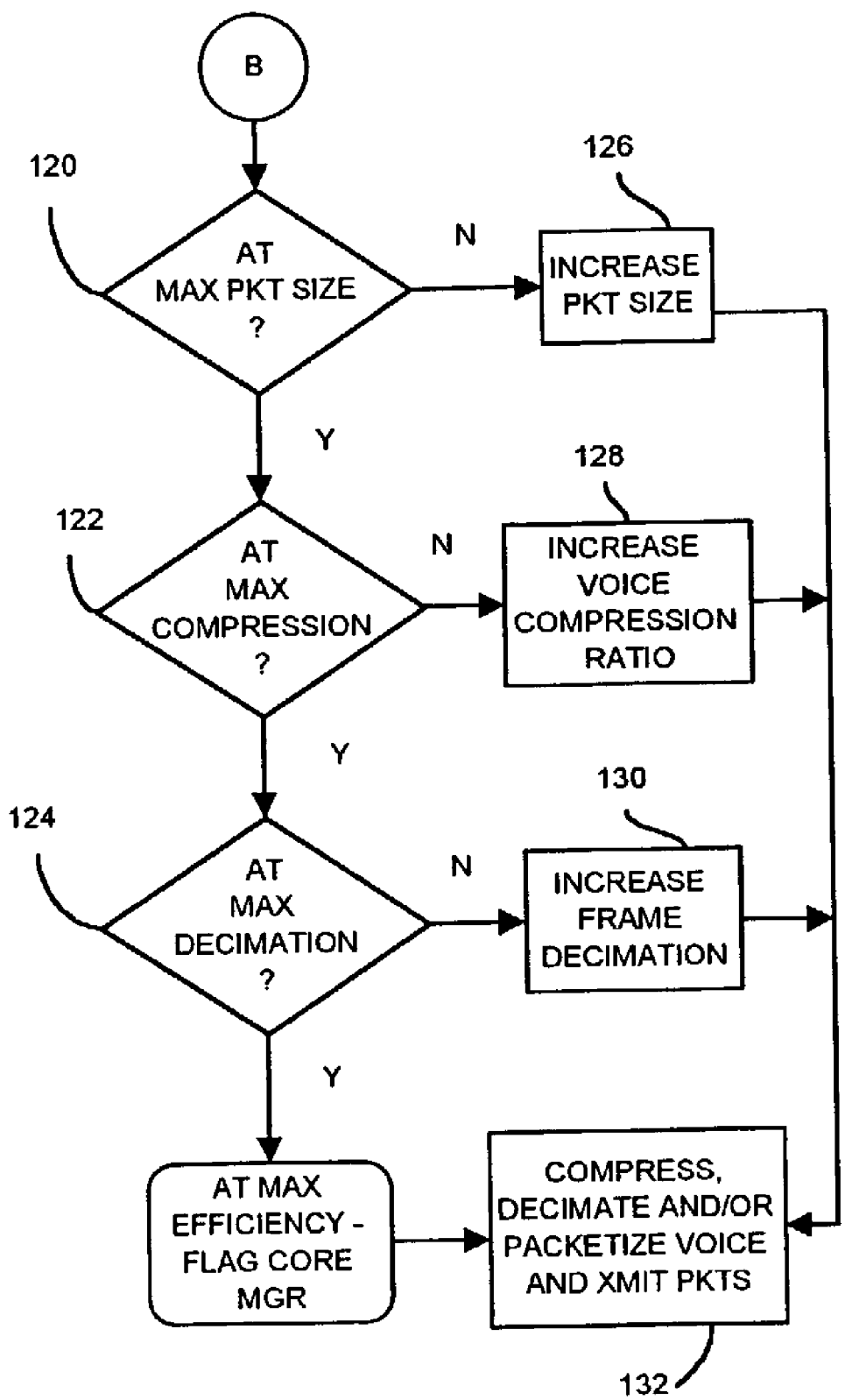
Figure 7C:
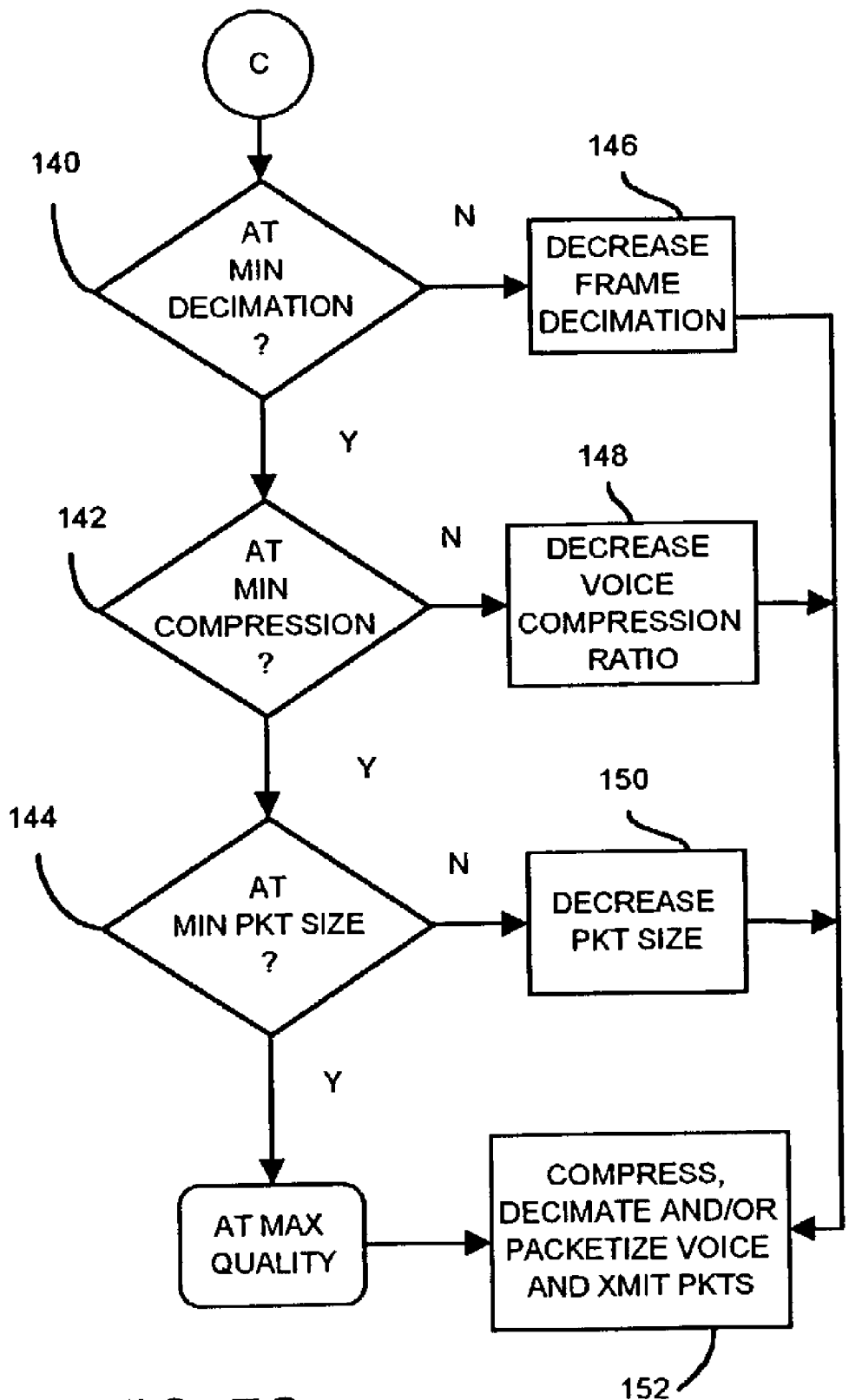

FIGS. 7A-C are flowcharts showing variable coding, compression, decimation, and packet sizing in response to bandwidth estimates received from a remote VOIP application. As new incoming packets are received by the jitter buffer, the bandwidth estimates from the remote VOIP application are extracted, step 102. The extracted bandwidth estimate is compared to the current sending bandwidth that the VOIP application is configured for. When the bandwidth estimate is the same as the sending bandwidth, step 104, then the bandwidth estimate and sending bandwidth are matched and the network is stable. No change to the coding, compression, decimation, and packet size needs to be made, step 108. The current settings for coding, compression, decimation, and packet size are used to create VOIP packets to be transmitted to the remote VOIP application, step 110.

When the bandwidth estimate is greater than the sending bandwidth, step 106, then there is excess bandwidth available in the path through the Internet. The sending bandwidth can be increased by decreasing coding, compression, decimation, and packet size efficiencies, step 114. This produces a better audio quality and potentially less delay but consumes more bandwidth as more bits of data are transmitted over the Internet path. FIG. 7C shows in more detail how efficiencies can be decreased.

When the bandwidth estimate is less than the sending bandwidth, step 106, then there is reduced bandwidth available in the path through the Internet. The network is operating above its limit, and congestion may soon occur. The sending bandwidth can be decreased by increasing coding, compression, decimation, and packet size efficiencies, step 112. This produces a reduced bandwidth consumption at the expense of deteriorated audio quality and increased delay. Fewer bits of data are transmitted over the Internet path due to the higher compression ratio. FIG. 7B shows in more detail how efficiencies can be increased.

In FIG. 7B, the sending bandwidth is too high and must be decreased to avoid congestion problems. The packet size being used by the variable packetizer is examined, step 120, to determine if the packet size is at the maximum allowable packet size. If the packet size can be increased further, the packet size is enlarged, step 126. Future VOIP packets generated by the variable packetizer use the new, larger packet size when audio data is packetized. The new configuration with the larger packet size is used to code, compress, decimate, and packetize the audio data for transmission, step 132.

When the packet size is already at the maximum size, step 120, more drastic configuration changes need to be taken. While increasing the packet size doesn't reduce the sound quality, coding, compression, and especially decimation changes can reduce audio quality. When the configuration does not use the maximum compression, step 122, a different, more compressed, coding method is configured, step 128. A different codec or a different compression algorithm that more highly compresses the voice data may be used. In general, the higher-compression codings have reduced voice quality, although different voice samples may be more accurately compressed with some methods than for others. VOIP packets generated by the variable packetizer use the new, more-highly compressed encodings when audio data is coded by the codecs. The new configuration with the new codec is used to code, compress, decimate, and packetize the audio data, step 132.

When the compression is already at the maximum size, step 122, even more drastic configuration changes need to be taken. Decimation can significantly reduce audio quality since entire audio frames are dropped. When the configuration does not use the maximum decimation, step 124, more decimation is configured, step 130. A greater percentage of audio frames may need to be dropped, such as one out of every six frames rather than one out of every ten frames.

Dropping more frames degrades the voice quality more, so decimation is not increased until packet size and compression changes are made. VOIP packets generated by the variable packetizer are now more-highly decimated. The new configuration with the new decimation ratio is used to code, compress, decimate, and packetize the audio data, step 132.

When the maximum packet size, step 120, maximum compression rate, step 122, and maximum decimation, step 124, are already configured, additional efficiencies are impossible. The audio data is compressed, decimated, and packetized using the current configuration which is already the most efficient. Of course, very high degrees of decimation could be used, such as dropping every other audio frame, but a decimation limit may be imposed.

Alternatively, when the most efficient configuration is reached and bandwidth estimates are still too low, all packet transmission could be halted and the user notified, or only a few small packets sent out. Other techniques could be used, such as re-initializing the call with the remote VOIP application, or waiting a period of time before sending any packets. If an alternate transport is available (different network, different routing, or conversion to Public-Switched-Telephone-Network phone call) it could be triggered at this point.

In FIG. 7C, the sending bandwidth is too low and can be increased. Excess bandwidth or capacity is available on the network path. More audio data can safely be transmitted over the path. Less efficient configuration setting may be used, improving the audio quality and reducing delay.

When the configuration does not use the least decimation, step 140, less decimation is configured, step 146. A reduced percentage of audio frames may need to be dropped, such as one out of every ten frames rather than one out of every five frames. The minimum decimation is typically zero, which has the best voice quality since no frames are dropped. Reducing or eliminating decimation can significantly increase voice quality. VOIP packets generated by the variable packetizer are now not decimated as much. The new configuration with the new, reduced decimation ratio is used to code, compress, decimate, and packetize the audio data for transmission, step 152.

When the last configuration does not use the minimum compression, step 142, a different, less compressed, coding method is configured, step 148. A different codec or a different compression algorithm that compresses the voice data to a lesser degree may be used. This tends to improve voice quality, although different voice samples may be more accurately compressed with some methods than other voice samples. VOIP packets generated by the variable packetizer use the new, less compressed encodings when audio data is coded by the codecs. The new configuration with the new codec is used to code, compress, decimate, and packetize the audio data, step 152.

When the decimation is at the minimum, such as zero, step 140, and the least-compressed codec is used, step 142, then the packet size being used by the variable packetizer is examined, step 144, to determine if the packet size is at the minimum configurable packet size. If the packet size can be decreased further, the packet size is reduced, step 150. Future VOIP packets generated by the variable packetizer use the new, smaller packet size when audio data is packetized. The new configuration with the smaller packet size is used to code, compress, decimate, and packetize the audio data for transmission, step 152.

When the decimation is at the minimum, such as zero, step 140, and the least-compressed codec is used, step 142, and the minimum packet size is used, step 144, then further increases in audio quality are not possible. The current configuration settings are used, step 152.

Each new incoming packet with a bandwidth estimate can further change the configuration. For example, each incoming packet with a bandwidth estimate that is still below the sending bandwidth can cause the packet size to be increased further until the maximum packet size is reached. The sending bandwidth increases as the configuration is changed, so eventually the sending bandwidth may fall to meet the bandwidth estimates. Then further increases in packet size are not needed unless the bandwidth estimates fall further. Relatively small changes in configuration per packet can add up to larger, rapid changes over many packets received in a short time.

The sending bandwidth can be updated once the configuration of coding, compression, decimation, and packet size is changed. A table can be used to determine the sending bandwidth based on the configuration of coding, compression, decimation, and packet size. The various steps can be combined into a configuration-table lookup that selects the next configuration, which may be a combination of changes in coding compression, decimation, and packet size.

The sending bandwidth can be based on the last bandwidth estimate, or an average of the last several bandwidth estimates. Then changes in the bandwidth estimate cause changes in configurations for coding, compression, decimation, and packet size, such as selection of the next configuration line in the configuration table.

Figure 8A:
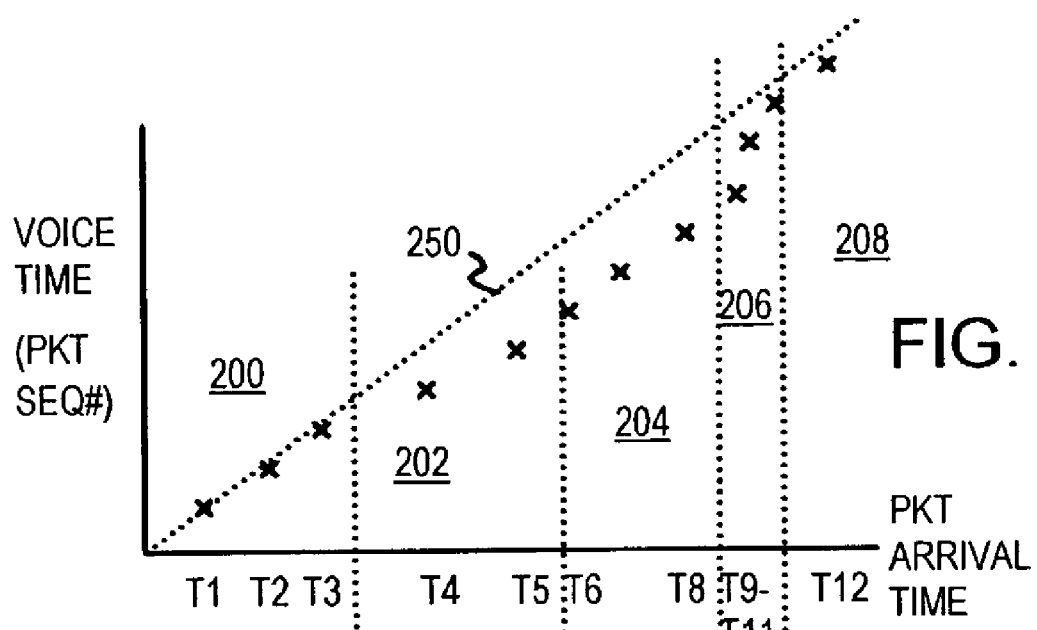
FIGS. 8A-C show graphs of packet arrivals, bandwidth estimates, and sending bandwidth changes.
Figure 8B:
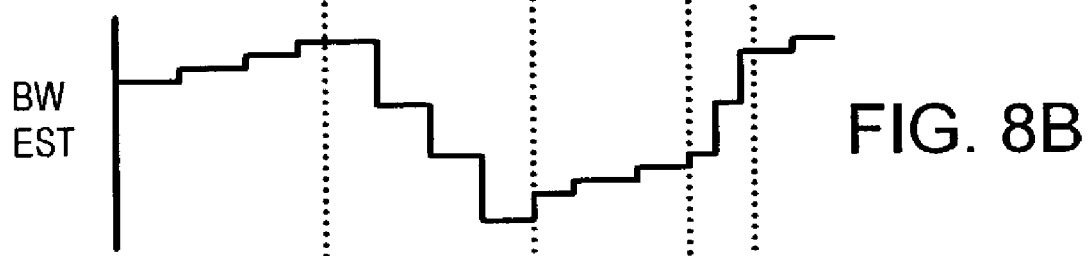
Figure 8C:
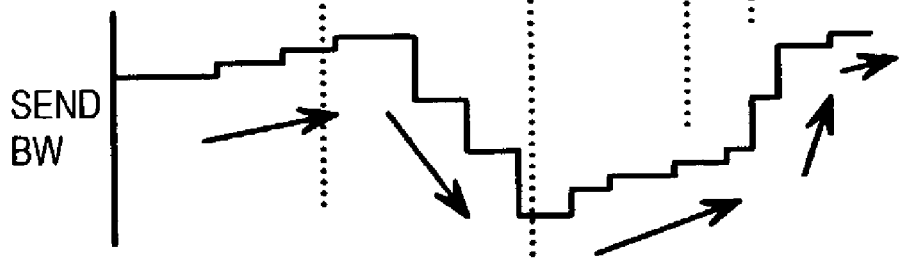

FIGS. 8A-C show graphs of packet arrivals, bandwidth estimates, and sending bandwidth changes. FIG. 8A has the voice time or packet sequence number as the y-axis and the actual arrival times of packets as the x-axis. In this example packets have the same voice durations and should all arrive with the same inter-packet arrival time and thus fall along ideal line 250.

During time period 200, packets arrive along ideal line 250. FIG. 8B shows that the bandwidth estimate is increased slightly during this time of network stability.

However, at time period 202, packets are delayed and arrive with longer inter-packet arrival times. Arrival times T4 and T5 are delayed, causing packets to arrive below ideal line 250, with a lower slope or arrival rate.

The bandwidth estimate is reduced by a portion of the lateness, and falls sharply during time period 202. When packets are very late, the bandwidth estimate can be reduced even before the packet arrives. A timer can wake up periodically to examine the most-recently-arrived packet. The maximum-size packet's duration can be compared against the time that has transpired since the last packet arrival. In an example where the network comes to almost a complete halt for an extended period, late packets can be detected by expiration of a maximum inter-arrival time. This can be factored into the bandwidth and congestion estimates.

Packets begin arriving at the ideal rate during period 204. The packets have the same slope as ideal line 250, but are below line 250 due to the delays from period 202. The bandwidth estimate rises slightly during this period.

The network recovers quickly during period 206 as many packets arrive in a short time. This can occur as a router recovers from a delay and works off its packet backlog. The packets rapid arrival produces a slope higher than that for ideal line 250, and eventually the packets reach line 250. The bandwidth estimate rises quickly during period 206 in proportion to the difference of inter-packet arrival time and the voice duration of the voice data inside the packets.

Finally in period 208 the network is again stable and packets arrive along ideal line 250. The bandwidth estimate is edged up slightly to test the upper limit of bandwidth.

While estimating bandwidth based on packet arrivals is performed by one VOIP application, responding to these bandwidth estimate changes is performed by the other VOIP application for the other user. Thus FIGS. 8A-B are performed on one VOIP application, such as VOIP application 30 (FIG. 3), while the response of FIG. 8C is performed by the other user's VOIP application, such as VOIP application 32.

In FIG. 8C, the sending bandwidth is adjusted to respond to changes in the bandwidth estimates of FIG. 8B. There is a time lag as the bandwidth estimates are transmitted over the network path. As bandwidth estimates rise slightly during period 200, configurations may be slowly changed to increase voice quality and decrease efficiencies. This consumes more bandwidth. During period 202, bandwidth estimates drop rapidly. After a time lag, sending bandwidth is drastically reduced, perhaps by increasing compression or decimating audio frames.

The relatively stable but low-bandwidth network conditions during period 204 allow the sending bandwidth to be increased slightly. Relatively similar configurations occur in period 204, causing the sending bandwidth to increase only slightly. This allows time for the network to recover before being flooded with more audio packets.

The rapid network recovery in period 206 causes the bandwidth estimates to rise. Successively less efficient configurations are selected to increase the sending bandwidth during this period. Voice quality improves.

The network is again stable in period 208. Bandwidth estimates increase slightly allowing the sending bandwidth to be increased somewhat.

Figure 9A:
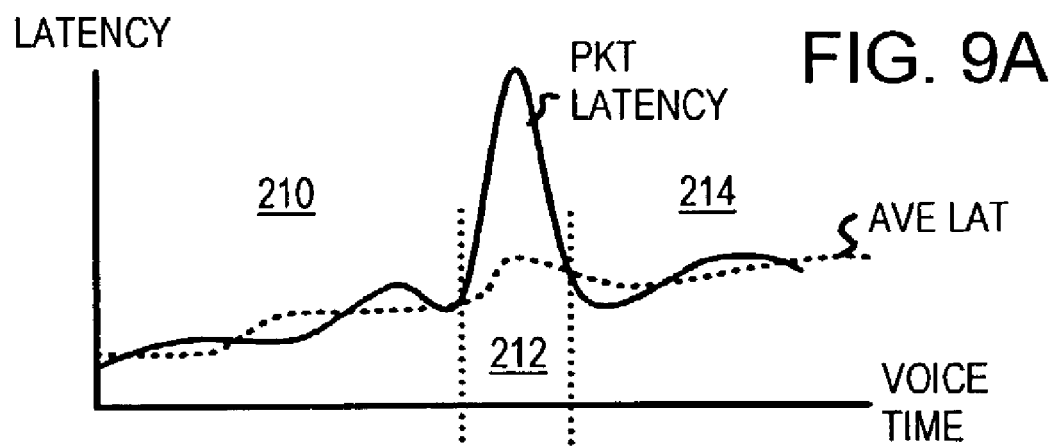
FIGS. 9A-C show graphs of packet latencies, congestion estimates and responses.
Figure 9B:
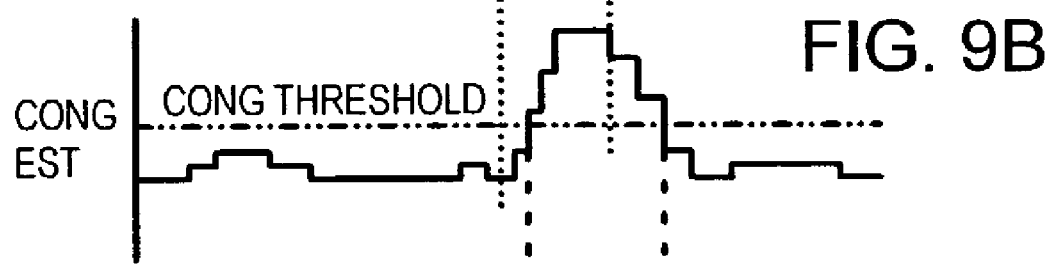
Figure 9C:
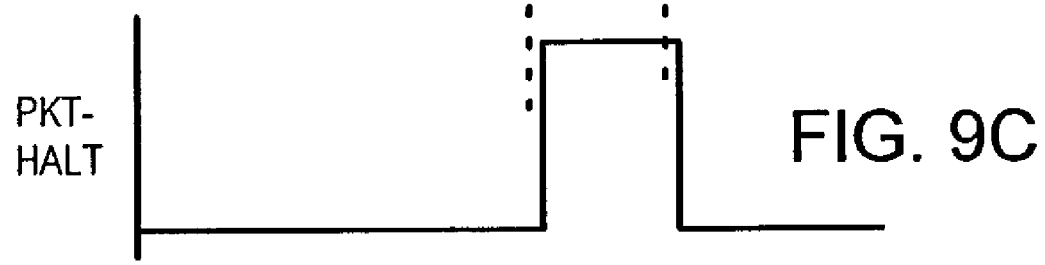

FIGS. 9A-C show graphs of packet latencies, congestion estimates and responses. In FIG. 9A, latencies of arriving VOIP packets are plotted as a function of voice time. A similar graph can be made using time or sequence number for the x-axis. The dotted line is the moving average of the latencies and shows less movement than the current packet latencies since it is an average.

Latencies are rising slightly over long time periods, as shown by the upward bias to the moving average during periods 210, 214. The congestion estimate remains relatively flat during periods 210, 214.

During period 212, a network problem or constriction occurs, causing the current packet latencies to rise sharply above the moving average. This can occur when a user sends or receives email over a modem line that is being used by the VOIP packets. The congestion estimate quickly rises as the latencies rise.

Rather than fall back as quickly as the latencies as the peak ends, the congestion estimate remains high as the current latencies fall sharply as FIG. 9B shows. This flat top to the congestion estimate allows time for the network to recover, perhaps causing the remote VOIP application to pause or reduce packet transmission until the congestion clears up. This can minimize the problem by not sending even more packets that could compound the congestion problem or which are likely to be discarded by the overburdened network if they are sent at that moment.

Once the current latencies cross the moving average line at the end of period 212 and the beginning of period 214, the congestion estimate starts to fall as the estimate is reduced by a small amount for each of many packets. At this point, the network should be roughly caught up from any packet backlog. As more packets are received, the congestion estimate falls back to the base level in period 214.

FIG. 9C shows responses to congestion estimates of FIG. 9B. While FIGS. 9A-B shows estimates made on a remote VOIP application, FIG. 9C shows the response of a local VOIP application to the estimates made by the remote VOIP application.

Congestion estimates can be responded to by pausing or halting packet transmission. This allows time for the congested router to fully recover before more packets are added to its buffer. Otherwise new packets could fill up the router's buffer, causing an overflow and dropped packets, compounding the congestion problem.

When the congestion estimate rises above a congestion threshold during period 212, the local VOIP application takes drastic action. All VOIP packets are held up and not sent out over the congested network path. Once the congestion estimate falls back below the congestion threshold during period 214, these packets are transmitted.

When the congestion is short, most or all of the packets held by the local VOIP application can be sent upon recovery. However, when the congestion occurs for a longer period of time, packets may be discarded by the local VOIP. Instead, fresh VOIP packets are sent once congestion ends. Very short moments of congestion can result in a tiny delay in sending the next packet almost similar to using a larger packet size in that it creates a small increase in the audio delay to the far-end user.

Other responses could be taken by the local VOIP application. For example, rather than halting all packet transmission, decimation could be significantly increased. Alternately, only a fraction of the packets could be transmitted to test the network path. Even though voice quality would be seriously degraded, detection of the end of congestion is improved. An error message could also be sent in a packet to the remote VOIP application, and the local and/or remote users notified of the problem by an audible tone or a displayed message.

Congestion Detected Before Packet Loss Occurs

Congestion can be detected before packet loss occurs by detecting a rise in latencies that often occurs before packets are dropped. Congestion is quickly detected by the use of the moving average. Congestion estimates rise quickly but fall more slowly, allowing time for congested packets to be cleared out. The congestion estimate is fed back to the sender, allowing the sending application to reduce the bandwidth of packets being sent until the congestion ends. Drastic and quick bandwidth reductions may be useful when congestion occurs.

The congestion estimate can quickly respond to delayed packets. The bandwidth estimate shows more of an overall picture of the total available flow of packets. The congestion estimate can more quickly react to sudden changes while the bandwidth estimate can be a smoother measure of the overall carrying capacity of the network path that is less sensitive to individual packets.

The congestion estimate may be designed to detect short term or sudden increases in the ability of the network to deliver packets, while the bandwidth estimate tracks the slower overall carrying-capacity of the network. Sharp changes in inter-packet arrival time (or lack of packet arrivals) trigger the congestion estimate to rise.

It is common for congestion to subside just as rapidly. Very gradual changes in the overall carrying-capacity of the network may be followed by the bandwidth estimate, which is less sensitive to momentary spikes of congestion.

Alternate Embodiments

Several other embodiments are contemplated by the inventor. For example, the packet size may be held constant while only the decimation and compression are adjusted, and combinations of adjustments can be made. More drastic changes in compression and decimation configuration could be taken when large changes in bandwidth estimates are received than when smaller estimate changes occur. In some cases a table of bandwidth conditions could be used to select specific combinations of packet size, compression and decimation, since in some cases the bandwidth gains by going to a higher level of compression may mean that decimation can be eliminated or a larger packet size be used and still arrive at a lower total bandwidth use.

Various combinations of software, hardware, or firmware implementations are possible and various routines can be called and executed sequentially or in parallel. While the VOIP packets have been described as being routed over the public Internet, packets may be routed over other networks or combinations of networks such as Ethernets, Intranets, wide-area networks, wireless networks, satellite links, etc. Unmanaged networks can be used or networks with some management. The audio packets can also include multi-media data such as images, video, or text.

Rather than estimate bandwidth by calculating the latency for each packet, only a subset of the packets could be checked, such as every 5th packet or every 50th packet. Changes in configuration may not occur for each packet but could be delayed. The durations of intervening packets could be summed. The bandwidth and congestion estimates could likewise be embedded in only some of the outgoing packets rather than all outgoing packets. The bandwidth and congestion estimates could also be sent in separate packets without voice data. The voice data is really audio data that is often voice, but could include other audio data such as songs, music, traffic noise, etc.

The bandwidth estimate could also be kept constant when the network is stable, or could be increased by a different amount or by a variable amount. The congestion estimate could be performed before or after the bandwidth estimate, or at the same time. Parallel processing could be used on some systems.

Some systems may use only the bandwidth estimate or only the congestion estimate. Other systems may only send bandwidth, packet-loss or congestion data when it has changed from previous values, or only send it on a subset of packets where there happens to be excess space at the end of the audio payload.

Network recovery typically is very quick, and the congestion estimate can be raised immediately, or as shown in the previous embodiment, the congestion estimate can be left at its present level until such time as the network has cleared any backlog of stale or delayed packets.

The bandwidth and congestion estimate and configuration-response routines could be activated by the jitter buffer when packets are late in arriving but before the packets arrive. Since the sending times of the missing packets are not known, they may be interpolated from other packets, or a fixed number used to calculate the new arrival time, latency, or voice duration. The amount of voice data in packets can vary from packet to packet rather than be the same for all packets as described in the simplified examples. The jitter buffer may perform other functions, such as detecting and processing duplicate and missing packets.

The send and receive times may be relative times or somewhat different times, such as a time-stamp added just before transmission or some delay after the packet arrives, or could be added at other times. The time-stamp may be a full time in a 24-hour format, or may be a subset of the full time, such as the current minute and seconds values, or may be a relative time value such as from a counter that changes with time. A processor or other hardware timer may used, or perhaps accessed using software routines. The sending and receiving VOIP application timer can be synchronized by a third-party timer, or by using round-trip packet transit times to adjust or correct timer differences.

Synchronization between the remote and local VOIP applications can occur at the start of communication. A series of packets can be exchanged simultaneously in both directions between the local and remote applications. Each synchronizing packet can contain a sent time-stamp to which is then appended a received time-stamp. The packet may be returned to the opposite side where a third time-stamp of the return arrival can be made. From these packets, the round trip delay is easily determined, and by comparing the sent, received, and returned time-stamps on packets which went in opposite directions an estimate of the latency in each direction can be made. Using this information, the clocks at both ends can either be synchronized, or a known offset can be recorded so that remote-application's time-stamps can be adjusted into local time of the local VOIP application. In an alternate embodiment, absolute time-stamps can be abandoned and the methods can be implemented purely on relative time-stamps. For example, a send time of 12653 milli-sec from the start of a call and can be compared to a previous send time-stamp of 12571 milli-sec to get an elapsed time measurement.

Outlying data points such as from very slow packets could be removed to allow for an occasional transient or random dropped or delayed packet. Additional filtering could be performed. Many kinds of moving averages can be used, such as a simple arithmetic moving average, weighted moving averages that increase weighting of more recent data points, exponential moving averages, etc.

Data values can be considered "equal" if within a certain range of each other, such as within 1% or 5% or 0.1%. Also, rounding of values can be performed before comparison, effectively providing a range of "equal" values. Congestion and bandwidth estimates can use only a few bits to indicate qualitative measurements such as "normal", "minor restriction", "major restriction", "blocked", or may use more bits to represent a quantitative estimate such as a percentage or data rate. One or both users could be notified of problems by an audible tone, vibration, or a display message, or the estimates could be logged to a file for debugging. The application may visually display a network-quality meter to the user.

VOIP calls may be between two users on personal computers, or may consist of one user on a personal computer talking to a computer server or gateway, which converts the call from VOIP to telephone or PBX or private IP phone system formats. The call could also be between two telephone or private IP-phone users with a VOIP segment somewhere in the middle carrying the call from one location to another over the Internet or similar unmanaged network but terminating the call at each end on a telephone or PBX or IP phone. Calls could also involve a conversation between one user on a PC or telephone or IP phone, and at the other end an automated voice response system such as a banking application, voicemail, auto attendant, talking yellow pages or other automated voice service. More than two parties may exist in multi-way calling.

Larger packets are more efficient due to a greatly reduced overhead of the packet header information compared to the voice data payload. A smaller number of larger packets can carry the same voice data payload more efficiently using fewer total bits of bandwidth than a larger number of small packets. In general, small packets are preferred since they reduce the latency of sending the voice from one application to another. But if the network is not keeping up with the quantity of packets being sent, delays will be rising already, and overall better performance can be reached by using larger more efficient packets that prevent the network from being overwhelmed.

Larger packets increase the delay in shipping audio data from one application to the other, so in the face of excess bandwidth it is desirable to use very small packets to minimize delays and make full duplex conversation and the ability for one user to interrupt the other as comfortable and immediate as possible. The practical minimum size of a packet is one audio frame which for most compression algorithms is in the region of 5 mSec to 30 mSec. There is no hard upper bound to how large a packet can be used, but as packet size is increased there can be diminishing returns on the savings in header data. Packet sizes of several seconds in length could theoretically be used, but could ruin full-duplex conversation just as buffering many seconds of data at the receiving jitter buffer would do. Depending on the nature of the application and how much bandwidth the network appears to have against the compression level which has been selected and the observed level of packet loss, an upper limit in the region of 40 mSec to 250 mSec for packet size is typical. The network IP protocol may also restrict the useful packet size to 1024 bytes or a multiple thereof depending on the details of the network and the routers supporting packet flow. Packet sizes of tens or hundreds of bytes are much more commonly used.

Some compression algorithms include support within their standard for marking frames of audio as voice or silence, and can forward representations of the background noise. This is called a Silence Identifier or sid frame. It can be used at the far side for efficient re-synthesis of quiet sections of near silent and fully silent audio. Variable thresholds and use of these compression algorithm silence/sid features can be used as can moving from one compression algorithm to another.

Decimation can pick from among the available audio frames ready to be shipped and select to decimate the ones least likely to have acoustic impact.

Sending bandwidth can be calculated as an absolute number based on the total number of bytes in each completed packet divided by the time interval which that packet represents, or it can be monitored on a relative basis compared to the bandwidth estimate being sent from the far side (one notch up, one notch down), or it can consist of a series of predetermined combinations of packet size, compression and decimation in a table with known associated bandwidth averages for each possible combination calculated ahead of time by the designer.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A computerized method for adjusting audio packet flow in response to continuous network monitoring for users of a Voice Over Internet Protocol (VOIP) audio application, where all users are running the same audio application, comprising:

a first user audio application receiving audio packets from a second user audio application, the audio packets containing audio data from a second user and additional data from the second user audio application used for generating bandwidth estimates by the first user audio application the first user audio application further receiving a series of bandwidth estimates from the second user audio application embedded in the audio packets, the bandwidth estimates indicating a current available bandwidth on a first network path from the first user audio application to the second user audio application;

reconstructing if required the audio data from the audio packets received from the second user audio application for playback to a first user of the first user audio application;

comparing the bandwidth estimates received from the second user audio application to a bandwidth threshold, and modifying the audio packets over the first network path when the bandwidth estimates are less than the threshold, modifying based on a result of the comparing, captured audio data from the first user and destined for the second user audio application; and forming the possibly modified captured audio data into audio packets and embedding a series of bandwidth estimates of current available bandwidth for the audio packet received by the first user audio application for transmission to the second user audio application over the first network path;

whereby the packets are modified by performing one or more of the following actions: adjusting the audio compression, adjusting packet length, adjusting the amount of decimation of the audio data;

whereby bandwidth estimates are continuously generated between the first user audio application and the second user audio application until communication between the two applications is terminated.

2. The computerized method of claim 1 further comprising pausing transmission of the audio packets, the pausing comprising reducing a number of audio packets transmitted by at least 90 percent or halting transmission of all audio packets for a period of time or sending only test audio packets to test for continuing low bandwidth conditions.

3. The computerized method of claim 1 wherein the audio packets from the second user audio application are sent over a second network path to the first user audio application;
while the audio packets from the first user audio application are sent over the first network path to the second user audio application;
wherein the first network path can differ from the second network path,
wherein asymmetrical network paths are monitored for low bandwidth conditions.

4. The computerized method of claim 1 wherein the second user audio application generates the bandwidth estimates by comparing a time between arrivals of audio packets from the first user audio application to a duration of audio data in the audio packets,
whereby bandwidth estimates are made by comparison of packet arrival rate to audio duration.

5. A closed-loop Voice Over IP (VOIP) system comprising:
a first user device running a first VOIP audio application for communicating over a network with a second user device running a second VOIP audio application;
wherein the first VOIP audio application comprises:
a jitter buffer that receives audio packets from the network, buffers and re-orders audio packets;
wherein the packets received by a first user application contain audio data from a second user audio application and additional data from the second user used for generating a bandwidth estimate by the first user;

the first user audio application further receiving a series of bandwidth estimates from the second user audio application embedded in the audio packets, the bandwidth estimates indicating a current available bandwidth on a first network path from the first user audio application to the second user audio application;

a variable packetizer for reconstructing if required the audio data from the audio packets received from the second user audio application for playback to a first user of the first user audio application;

a comparator for comparing the bandwidth estimates received from the second user audio application to a bandwidth threshold, and modifying the audio packets over the first network path when the bandwidth estimates are less than the threshold, wherein based on a result of comparing, modifying captured audio data from the first user and destined for the second user audio application;

a bandwidth estimator, determining bandwidth estimates by a first user;

the variable packetizer forming the possibly modified captured audio data into audio packets and embedding a series of bandwidth estimates of current available bandwidth for the audio packet received by the first user audio application for transmission to the second user audio application over the first network path; and wherein the variable packetizer modifies the packets by performing one or more of the following actions: adjusting the audio compression, adjusting packet length, adjusting the amount of decimation of the audio data;

whereby bandwidth estimates are continuously generated between the first user audio application and the second user audio application until communication between the two applications is terminated.

6. The closed-loop VOIP system of claim 5 wherein the variable packetizer has a plurality of codecs, the variable packetizer selecting a codec for compressing the captured audio based on the second user's bandwidth estimate.

7. The closed-loop VOIP system of claim 6 wherein the variable packetizer further comprises a configuration table that lists configurations of the variable packetizer that produce VOIP packets with different compression ratios, the variable packetizer selecting a configuration in the configuration table in response to the second user's bandwidth estimates.

8. The closed-loop VOIP system of claim 5 wherein the bandwidth estimator comprises a function which determines bandwidth estimates by comparing a time between arrivals of audio packets to the audio durations in the packets.

9. The closed-loop VOIP system of claim 5 wherein the bandwidth estimator comprises a function which determines bandwidth estimates by counting packets which have not arrived at the expected time, without waiting to determine the packet delay.

10. The closed-loop VOIP system of claim 5 wherein the bandwidth estimator comprises a function which determines a one-way latency for audio packets sent by the second user's audio application to the first user's audio application, and comparing the one-way latency to a moving average latency that is an average of one-way latencies of many audio packets.

* * * * *